United States Patent
Xiao

(10) Patent No.: US 6,776,482 B1
(45) Date of Patent: Aug. 17, 2004

(54) OPTICAL LENS SECURER DEVICE FOR SPECTACLES

(75) Inventor: Tony Xin Xiao, Walnut, CA (US)

(73) Assignee: Viva International Group, Somerville, NJ (US)

(*) Notice: Subject to any disclaimer, the term of this patent is extended or adjusted under 35 U.S.C. 154(b) by 0 days.

(21) Appl. No.: 10/419,574

(22) Filed: Apr. 21, 2003

(51) Int. Cl.[7] .................................................. G02C 1/02
(52) U.S. Cl. ...................... 351/110; 351/140; 351/147
(58) Field of Search ................................. 351/110, 140, 351/141, 145–147, 149, 151, 152, 51, 52

(56) References Cited

U.S. PATENT DOCUMENTS

| 6,170,950 B1 | * | 1/2001 | Yoshida | .................. | 351/110 |
| 6,502,940 B1 | * | 1/2003 | MacIntosh, Jr. | ............ | 351/110 |
| 6,588,894 B2 | * | 7/2003 | Anger | ...................... | 351/110 |
| 2002/0176047 A1 | * | 11/2002 | Takeda et al. | ............. | 351/110 |
| 2003/0058402 A1 | * | 3/2003 | Conner | ...................... | 351/110 |

* cited by examiner

Primary Examiner—Huy Mai
(74) Attorney, Agent, or Firm—Abelman, Frayne & Schwab

(57) ABSTRACT

An optical lens securer device for spectacles which includes at least an optical lens having a through slot and a spectacle frame having a coupling portion. The optical lens securer device includes a locking holder and a locking member. The locking holder, having a locking groove defining therethrough, is extended from the coupling portion of the spectacle frame, wherein the locking holder is mounted on the optical lens at a position that the locking groove is aligned with the through slot. The locking member includes a holding base and a locking arm extended therefrom to securely insert into the locking groove through the through slot so as to fasten the optical lens between the holding base and the locking holder for securely attaching the spectacle frame to the optical lens.

36 Claims, 10 Drawing Sheets

OPTICAL LENS SECURER DEVICE FOR SPECTACLES

BACKGROUND OF THE PRESENT INVENTION

1. Field of Invention

The present invention relates to a spectacle frame, and more particularly to an optical lens securer device for efficiently and securely mounting a pair of temples and a bridge to a pair of eyeglass lenses to construct a rimless spectacles.

2. Description of Related Arts

A conventional rimless spectacles comprises two optical lenses, a bridge having two ends directly mounted to two inner sides of the lenses respectively, and two side extensions mounted to two outer sides of the lenses for coupling with two temples respectively. A conventional lens-mounting construction for the side extension, for example, generally incorporates with a secure joint to securely connect each of the side extensions with the respective lenses. The secure joint comprises a fastening bolt rearwardly extended from a side extension, which is mounted on a front side of the lens to slidably insert through a circular through hole formed at the outer edge portion of the lens, and a locking nut is arranged to screw on a tail of the fastening bolt to firmly hold the lens between the side extension and the locking nut, so as to securely mount the side extension on the lens. However, due to the size of the fastening bolt, the circular through hole on the lens must be substantially enlarged to fit the fastening bolt. In addition, a tearing force may be created around the circumferential edge of the circular through hole to crack the lens while a screwing force is applied on the locking nut.

FIG. 1 illustrates an improved secure joint which does not require any screwing for lens mounting connection. Such secure joint has two through holes formed on the outer edge portion of the lens and comprises two locking pins rearwardly extended from the side extension and a fastener having two pin sockets, wherein the fastener is mounted at a rear side of the lens to insert the two pin sockets into the two through holes respectively such that the side extension is then mounted on the front side of the lens to insert the two locking pins into the pint sockets respectively. However, such secure joint has several drawbacks.

Since the thickness of a short-sight lens is gradually increased at the outer edge portion thereof and the thickness of a long-sight lens is gradually decreased at the outer edge portion thereof, the two through holes have different lengths and the two pin sockets must be shaped in different lengths to fit the through holes corresponding to their positions on the lens. It is known that the thickness of the lens is configured the degree of the wearer wherein the thicker lens of the spectacles is constructed for the wearer having higher degree of vision. Therefore, the pin sockets must be custom made to fit the various thickness of the lens that highly increases the manufacturing costs of the spectacles. In other words, such secure joint is preferred for the lens having a predetermined thickness, generally 600 degrees or less for short-sight lens.

Furthermore, the distance between the two though holes on the lens must be set equal to the distance between the two locking pins on the side extension. In other words, the through holes must be correctly formed on the lens for the pin sockets of the fastener inserting thereinto respectively so as to coincide with the locking pins of side extension.

In addition, the mounting configuration of the secure joint must be very precise. The size of each of the through holes must fit the respective pin socket inserted thereinto while each of the locking pins must be sized and shaped to fit into the respective pin socket. In other words, the pin socket must be precisely made that the size and shape of the pin socket is coincident with the respective through hole and the locking pin.

Therefore, the assembly by the arrangement of the pin and socket attachment involves multiple precise parts and is thus expensive in production.

Therefore, the assembly of the optical lenses and the rimless frame with such secure joints may not suitable to be carried in the optical retail shops of the optical clinics of the opt must generally be carried in the spectacles company's own opticians or laboratories.

SUMMARY OF THE PRESENT INVENTION

A main object of the present invention is to provide an optical lens securer device for spectacles, which is adapted for securely mounting optical lenses with a coupling member of spectacles such as a temple and a bridge.

Another object of the present invention is to provide an optical lens securer device for spectacles, which comprises an elongated locking member inserting into a through slot formed on a lens at one side thereof to fasten with a locking holder at an opposed side of the lens so as to provide a secure attachment for the lens.

Another object of the present invention is to provide an optical lens securer device for spectacles, wherein the attachment operation is simple as a tie-and-lock attachment to the lens by slidably inserting the locking member into the locking holder through the through slot, so that the assembly of the lenses and the frame can be carried by the spectacles retailers or optical clinics themselves that substantially minimizes the assembly and manufacturing cost thereof.

Another object of the present invention is to provide an optical lens securer device for spectacles, which is specifically designed for all kinds of rimless spectacles having various thicknesses. The protruding tail portion of the locking arm of the locking member is arranged to be cut with respect to the thickness of the lens so that the optical lens securer device of the present invention is a universal securer device to mount the coupling member to the lens for the rimless spectacles.

Another object of the present invention is to provide an optical lens securer device for spectacles, which successfully provides an economic and efficient solution for attaching the coupling member to the lens to form a set of rimless spectacles.

Accordingly, in order to accomplish the above objects, the present invention provides a spectacle device, comprising:

an optical lens having a through slot;

a spectacle frame having a coupling portion; and an optical lens securer device, comprising:

a locking holder, having a locking groove defining therethrough, extended from the coupling portion of the spectacle frame, wherein the locking holder is mounted on the optical lens at a position that the locking groove is aligned with the through slot; and a locking member comprising a holding base and a locking arm extended therefrom to securely insert into the locking groove through the through slot so as to connect the optical lens between the holding base and the locking holder for securely attaching the spectacle frame to the optical lens.

These and other objectives, features, and advantages of the present invention will become apparent from the following detailed description, the accompanying drawings, and the appended claims.

DETAILED DESCRIPTION OF THE PREFERRED EMBODIMENT

Figure 1:
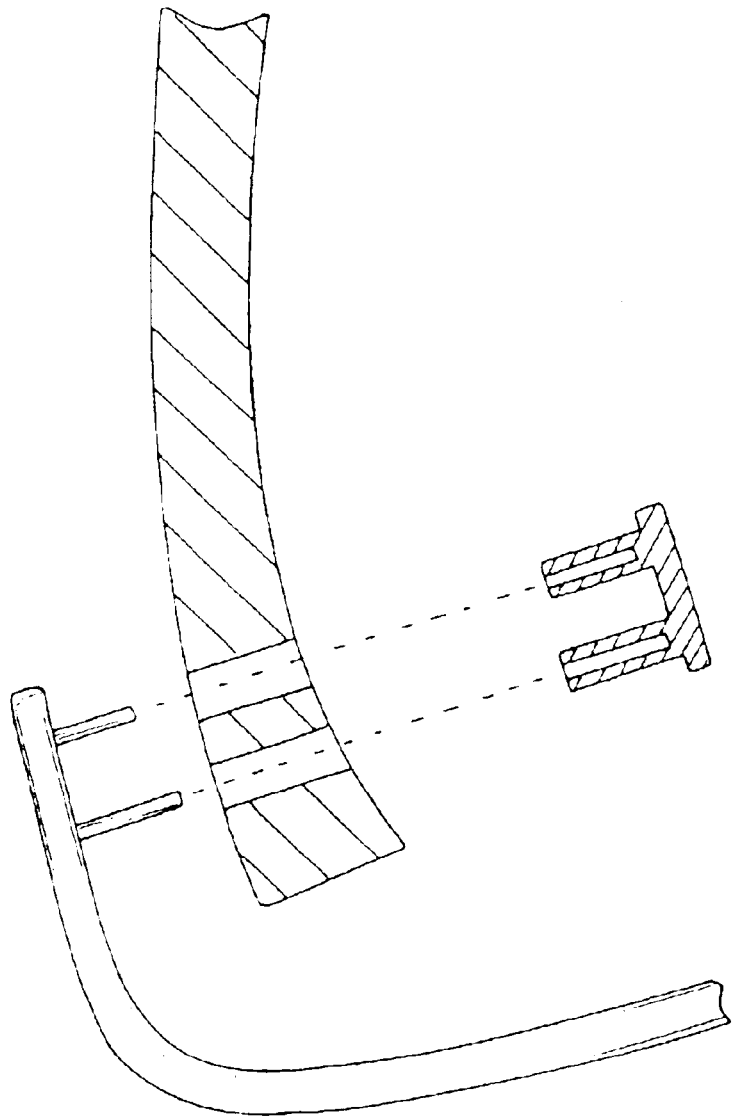
FIG. 1 is a sectional view of a conventional secure joint of a spectacles.
Figure 2A:
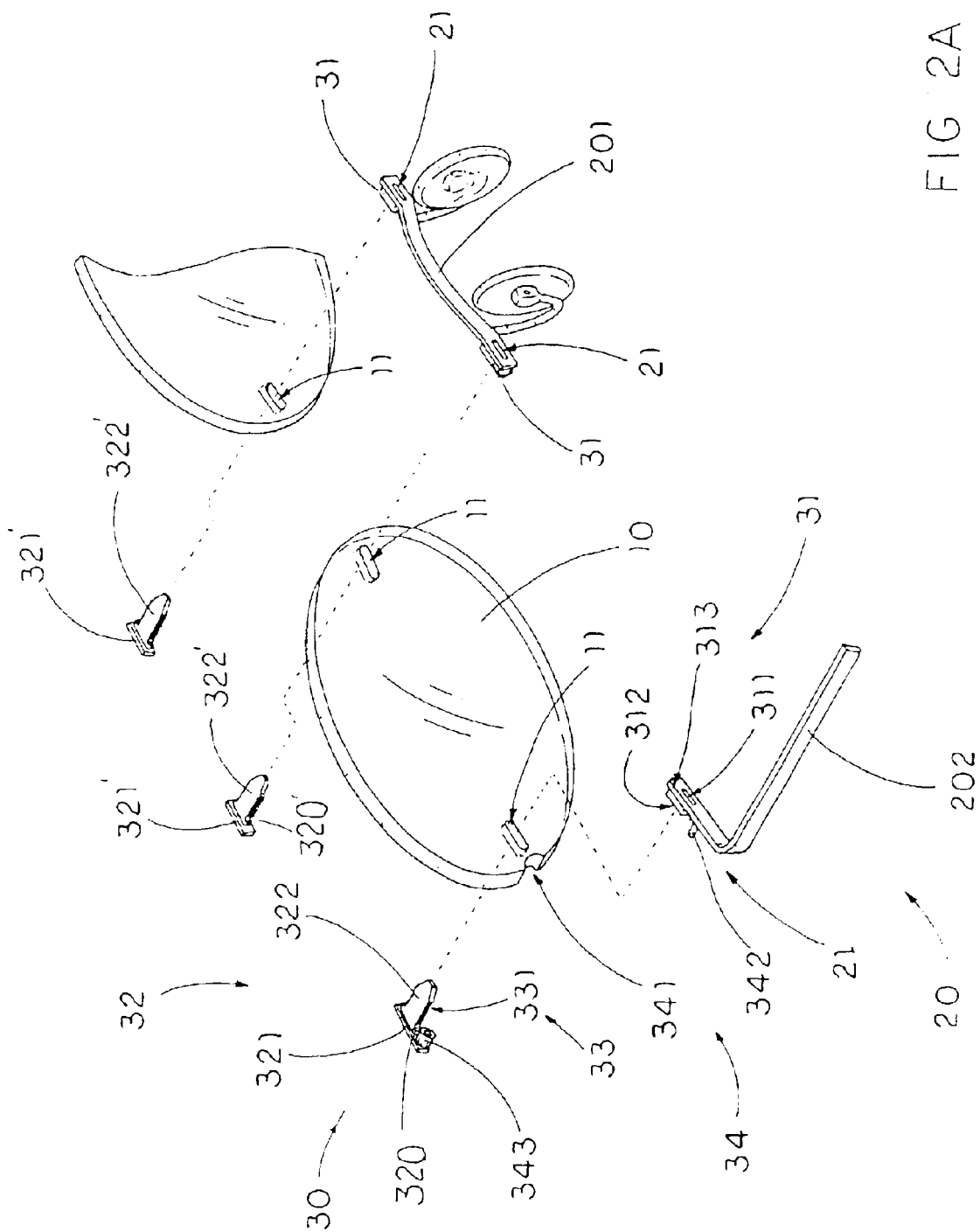
FIG. 2A is an exploded perspective view of an optical lens securer device incorporating with the spectacles according to a preferred embodiment of the present invention.
Figure 3A:
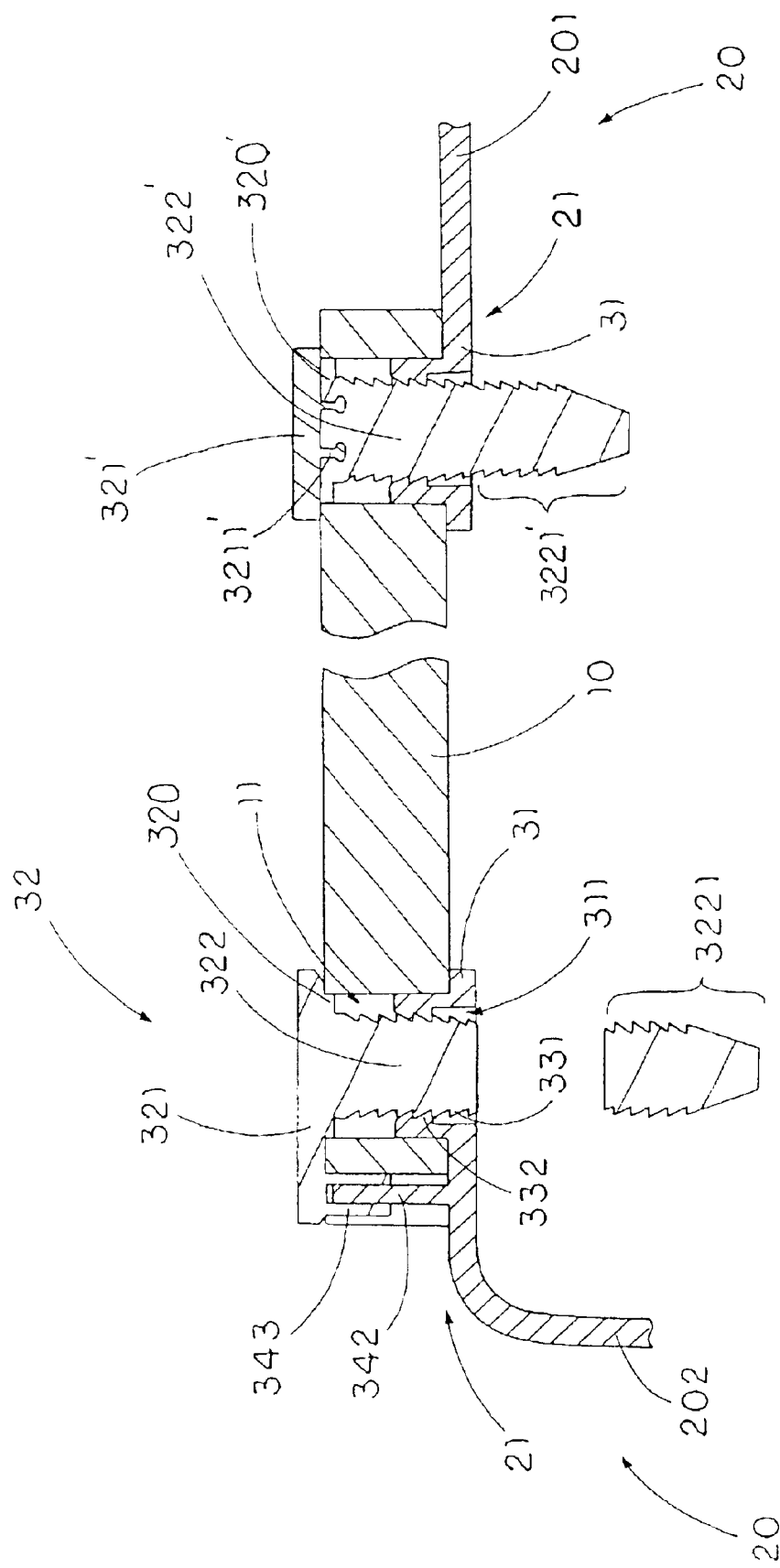
FIG. 3A is a sectional view of the optical lens securer device of the spectacles according to the above preferred embodiment of the present invention.

Referring to FIGS. 2A and 3A of the drawings, a spectacle device according to a preferred embodiment of the present invention is illustrated, wherein the spectacle device comprises a pair of optical lenses 10 each having a predetermined thickness and at least a through slot 11, a spectacle frame 20 having at least a coupling portion 21, and at least an optical lens securer device 30.

The optical lens securer device 30 comprises a locking holder 31, having a locking groove 311 defining therethrough, extended from the coupling portion 21 of the spectacle frame 20 wherein the locking holder 31 is mounted on the optical lens 10 at a position that the locking groove 311 is aligned with the through slot 11, and a locking member 32 comprising a holding base 321 and a locking arm 321 extended therefrom to securely insert into the locking groove 311 through the through slot 11 so as to interlock the optical lens 10 between the holding base 321 and the locking holder 31 for securely attaching the spectacle frame 20 to the optical lens 10.

Accordingly, the spectacle frame 20 comprises a bridge 201 and two side extensions 202 wherein the bridge 201 has two ends embodied as two coupling portions 21 to attach between two inner sides of the two optical lenses 10 respectively and the side extension 202 has an end embodied as the coupling portion 21 to attach to an outer side of the respective optical lens 10. In other words, the optical lens securer device 30 is used for securely connecting the bridge 201 and/or the side extension 202 to the optical lens 10 to form a set of rimless spectacles.

According to the preferred embodiment, the optical lens securer device 30 is applied on the side extension 202 of the spectacle frame 20 as an example for illustrating the connection between the spectacle frame 20 and the optical lens 10 via the optical lens securer device 30 of the present invention.

As shown in FIG. 3A, the locking holder 31 is integrally formed at the coupling portion 21 of the spectacle frame 20 wherein the locking holder 31 is mounted on a rear side (a first side) of the optical lens 10 at a position that the locking groove 311 of the locking holder 31 is aligned with the through slot 11 of the optical lens 10. The locking holder 31 further has an insertion portion 312 fittingly inserted into the through slot 11 of the optical lens 10. The locking holder 31 may further has a biasing portion 313 arranged in such a manner that when the insertion portion 312 of the locking holder 31 is inserted into the through slot 11, the biasing portion 313 of the locking holder 31 is biased against the rear side of the optical lens 10. Accordingly, the locking groove 311 is extended from the insertion portion 312 of the locking holder 31 to the biasing portion 313 thereof so as to communicate with the through slot 11 of the optical lens 10.

The locking member 32 is mounted on a front side (an opposed second side) of the optical lens 10 at a position that the holding base 321 is biased against the front side of the optical lens 10 while the locking arm 322 is securely inserted into the locking groove 311 of the locking holder 31 through the through slot 11. Accordingly, the locking arm 322 of the locking member 32 has a predetermined length at least larger than a total thickness of the optical lens 10 and the locking holder 31. In addition, a base shoulder 320 which is sized and shaped with respect to the through slot 11, is formed at a root portion of the locking arm 322 to fittingly and securely inserted into the front end of the through slot 11 to hold the locking member 32 in position.

In order to fittedly match the locking arm 322 with the thickness of the optical lens 10, the locking arm 322 has a tail portion 3211, wherein when the locking arm 322 is securely connected with the locking holder 31, the tail portion 3211 of the locking arm 322 is protruded from the locking groove 311 of the locking holder 31 such that by cutting off the tail portion 3211 of the locking arm 322, the length of the locking arm 322 is reduced to match with the total thickness of the optical lens 10 and the locking holder 31. Therefore, the optical lens securer device 30 can fit for all kinds of optical lens 10 having various thickness.

The locking arm 322, having a non-circular cross section, is securely inserted into the locking groove 311 having a corresponding non-circular cross section, so as to resist any unwanted movement, such as a twisting movement, of the spectacle frame 20 with respect to the optical lens 10. According to the preferred embodiment as shown in FIGS. 2A, both the through slot 11 and the insertion portion 312 are made to have a width larger than a height thereof for rigid connection, wherein each of the through slot 11 and the insertion portion 312 has two round ends and the through slot 11 is sized and shaped to enable the insertion portion 312 fittingly inserting therein.

Furthermore, the locking member 32 is made of elastic material such as PVC to prevent the scratch on the optical lens 10 when the locking arm 322 is securely inserted into the through slot 11 of the optical lens 10, wherein the locking arm 322 is integrally extended from the holding base 321 to form a one-piece member for connecting the side extension 202 of the spectacle frame 20 with the optical lens 10, as shown in FIG. 2.

Alternatively, the holding base 321' can be made of rigid material such as metal and the locking arm 322' is made of elastic material, as shown in FIG. 2A, wherein the holding base 321' has at least an engagement arm 3211' protruding therefrom to engage with the locking arm 322' by molding such that the locking arm 322' is securely extended from the holding base 321' to connect with the locking holder 31 for connecting the bridge 201 of the spectacle frame 20 with the optical lens 10. Similarly, as shown in FIG. 2A, a base shoulder 320', which is sized and shaped with respect to the through slot 11, is formed at a root portion of the locking arm 322' to fittingly and securely inserted into the front end of the through slot 11 to hold the locking member 32 in position. It is worth to mention that the holding base 321' can have a logo formed thereon to enhance the aesthetic appearance of the spectacles.

The locking arm 322 is securely connected with the locking holder 31 by means of an interlocking means 33 which comprises a plurality of engaging teeth 331 evenly formed on an outer circumferential surface of the locking arm 322 and at least two corresponding locking teeth 332 which are provided on an inner wall of the locking groove 311 and arranged in such a manner that when the locking arm 322 is inserted into the locking groove 311 of the locking holder 31, the locking teeth 332 are securely interlocked with the engaging teeth 331 so as to connect the locking arm 322 with the locking holder 31 for connecting the spectacle frame 20 with the optical lens 10.

It is worth to mention that each of the engaging teeth 331 is outwardly protruded from the locking arm 322 at a direction that opposes to an inserting direction of the locking arm 322 with respect to the locking groove 311 while each of the locking teeth 332 is outwardly protruded from the inner wall of the locking groove 311 at a direction with respect to the inserting direction of the locking arm 322 in such a manner that when the locking arm 322 is inserted into the locking groove 311, the engaging teeth 331 are interlocked with the locking teeth 331 so as to prevent the locking arm 322 being slid in a reverse direction.

As shown in FIGS. 2A and 3A, the optical lens securer device 30 may further comprises a retaining arrangement 34 which has a retaining groove 341 formed on an outer edge of the optical lens 10 and comprises a retaining arm 342 extended from the locking holder 31 to bias against the retaining groove 341 and a mounting socket 343 extended from the holding base 321 to enable the retaining arm 342 to securely insert therein so as to retain the spectacle frame 20 in position with respect to the optical lens 10. Therefore, the optical lens securer device 30 provides a two-point connection to securely connect the spectacle frame 20 with the optical lens 10 to prevent any twisting movement of the spectacle frame 20 with respect to the optical lens 10.

In order to directly mount the spectacle frame 20 to the optical lenses 10 to form the rimless spectacles, each of the locking holders 31 is positioned on the rear side of the respective optical lens 10 to align the locking groove 311 with the through slot 11. Then, by pulling the locking arm 322 of the locking member 32 to insert the locking arm 322 into the locking groove 311 through the through slot 11 until the holding base 321 is biased against the front side of the optical lens 10, the locking tooth 332 is interlocked with the corresponding engaging teeth 332, so that the optical lens 10 is securely sandwiched between the locking holder 31 and the holding base 321 in order to securely mount the spectacle frame 20 to the optical lens 10. By cutting off the tail portion 3221 of the locking arm 322, the length of the locking arm 322 can be adjustably reduced to match with the thickness of the optical lens 10. Therefore, the lens-mounting operation of the present invention is simple as a tie-and-lock operation so as to minimize the manufacturing cost of the present invention.

It is worth to mention that since the coupling portion 21 of the spectacle frame 20 is mounted on the rear side of the optical lens 10 via the locking holder 31, the holding base 321 of the locking member 32 can be made of transparent material such that no significant connection between the optical lens 10 and the spectacle frame 20 can be seen from the front of the spectacles so that the optical lens securer device 30 not only securely mounts the spectacle frame 20 to the optical lens 10 to form the rimless spectacles but also can keep the aesthetic appearance of the spectacles.

In order to detach the spectacle frame 20 from the optical lens 10, the wearer is able to simply tear off the holding base 321 from the locking arm 322 so as to release the interlocking of the locking holder 31. Since the locking member 32 is relatively inexpensive, the locking member 32 can be easily replaced when it is worn out.

Figure 2B:
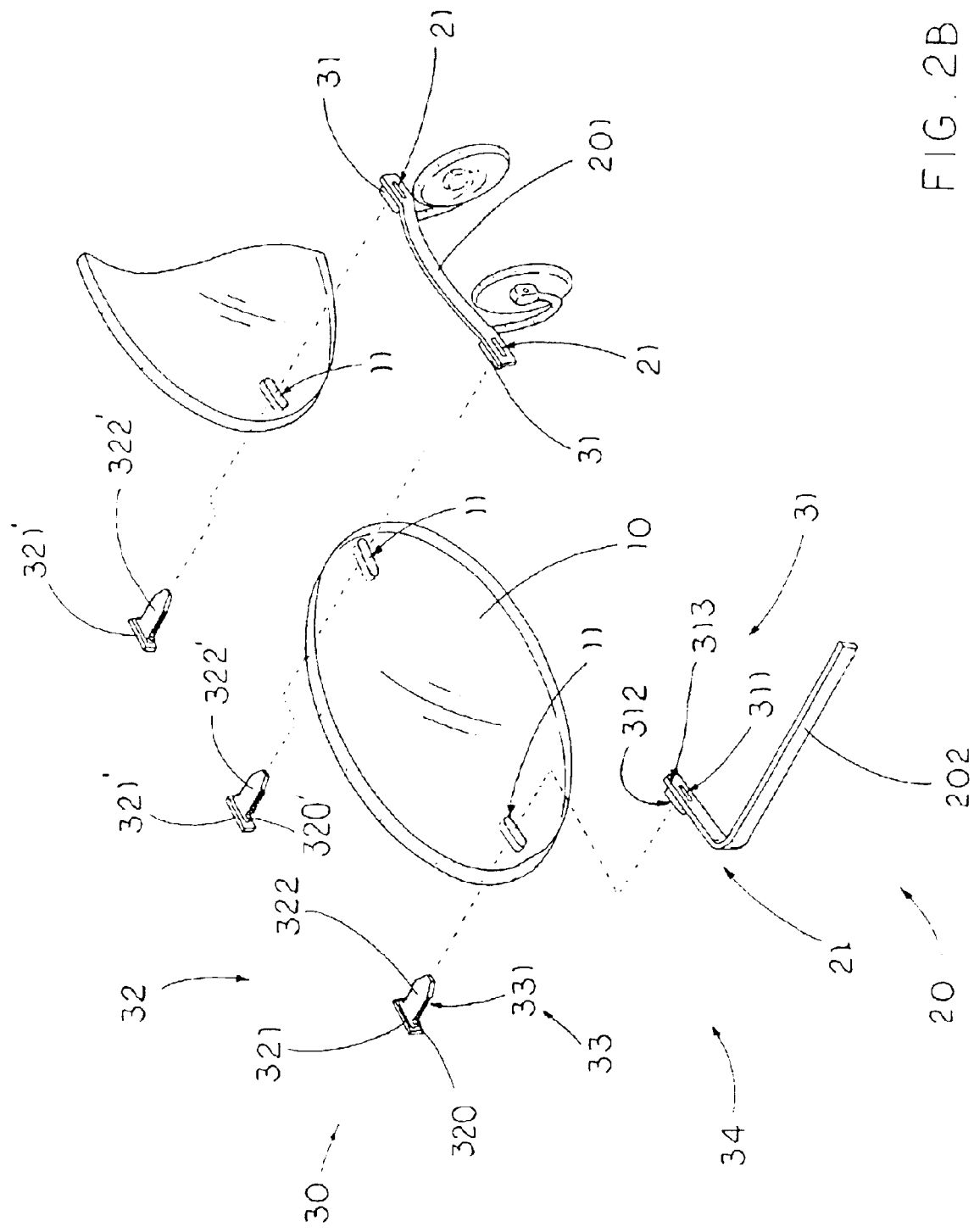
FIG. 2B is an exploded perspective view of an alternative mode of the optical lens securer device incorporating with the spectacles according to the above preferred embodiment of the present invention.
Figure 3B:
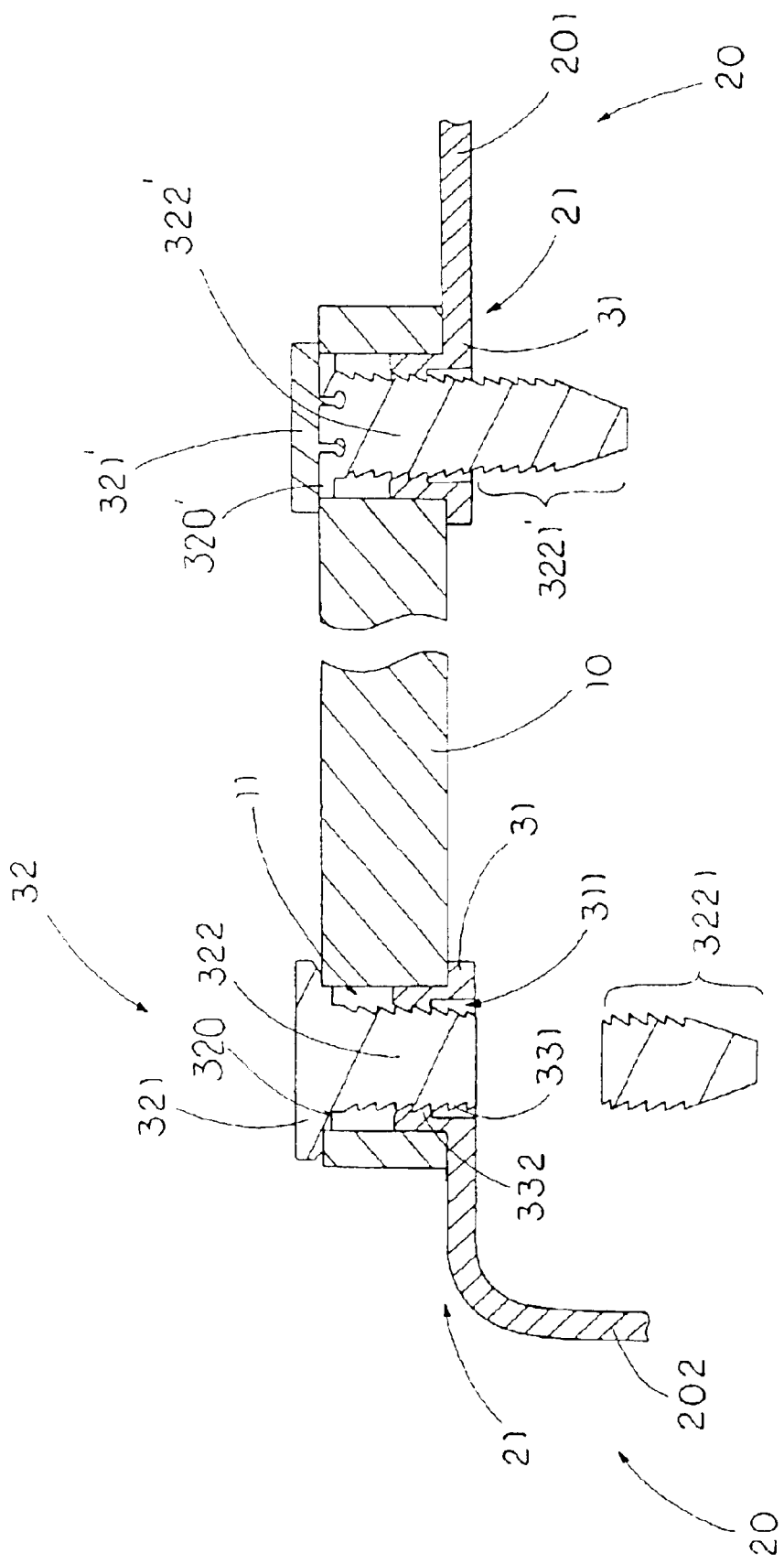
FIG. 3B is a sectional view of the alternative mode of the optical lens securer device incorporating with the spectacles according to the above preferred embodiment of the present invention.

Referring to FIGS. 2B and 3B, an alternative mode of the above preferred embodiment is illustrated, wherein the mounting socket 343 and the retaining arm 342 of the above embodiment are removed and no retaining groove 341 as shown in FIG. 2A is required to form on the outer edge of the optical lens 10, so as to illustrate that the side extension 202 and the bridge 201 can still be securely and firmly mounted to the optical lenses 10 due to the wide connection of the wide and thin insertion portion 312 and the through slot 11.

Figure 3C:
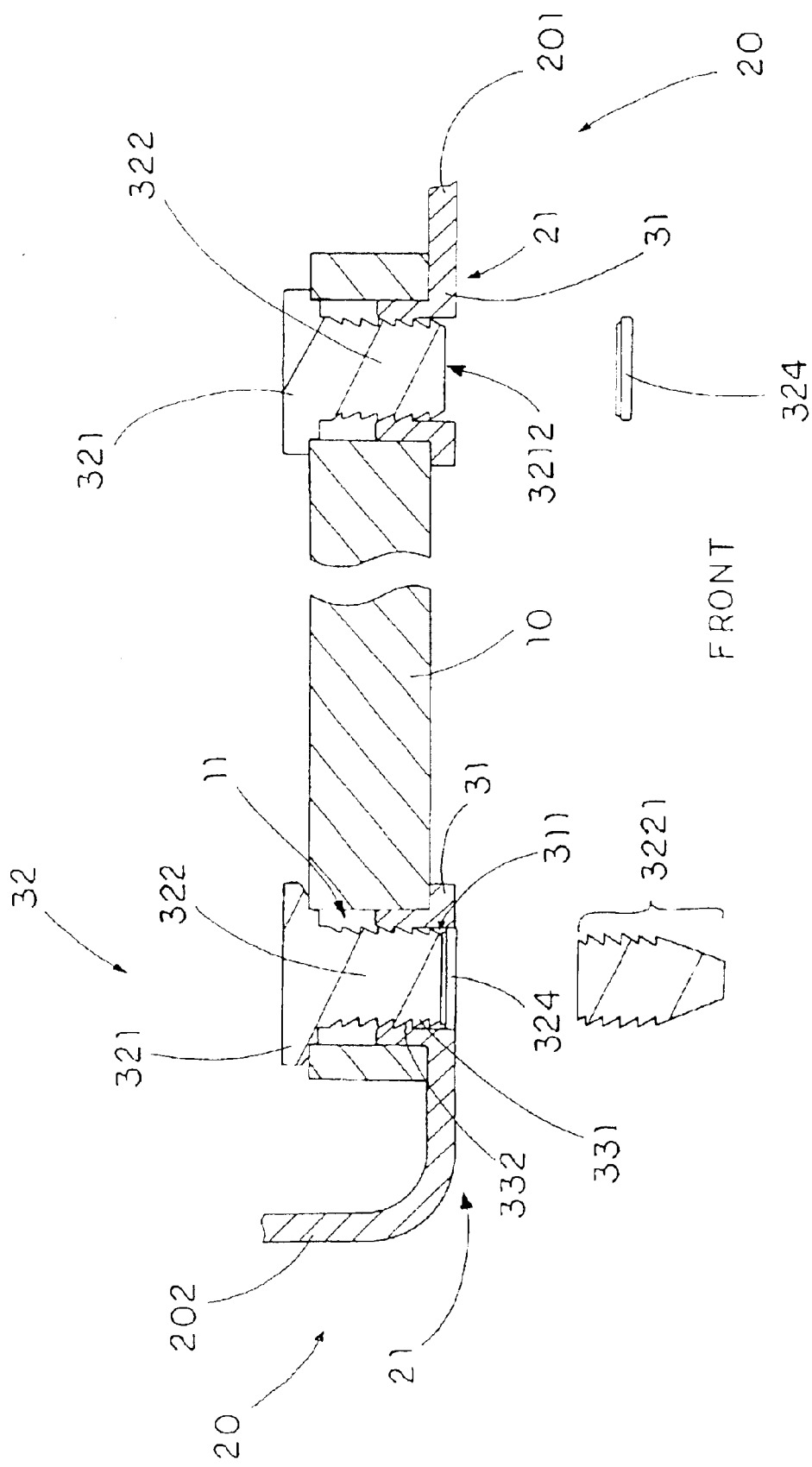
FIG. 3C illustrates another alternative mode of the optical lens securer device incorporating with the spectacles according to the above preferred embodiment of the present invention.

FIG. 3C illustrates another alternative mode of the attachment of the optical lens securer device 30, wherein the locking holder 31 is mounted on a front side of the optical lens 10 at a position that the locking groove 311 of the locking holder 31 is aligned with the through slot 11 of the optical lens 10.

The locking member 32 is mounted on the rear side of the optical lens 10 at a position that the holding base 321 is biased against the rear side of the optical lens 10 while the locking arm 322 is securely inserted into the locking groove 311 of the locking holder 31 through the through slot 11.

When the locking arm 322 is securely engaged with the locking holder 31 by interlocking the engaging teeth 331 with the locking teeth 332, the tail portion 3211 of the locking arm 322 is protruded from the front end of the locking groove 311 of the locking holder 31 such that by cutting off the tail portion 3211 of the locking arm 322, the length of the locking arm 322 is reduced to match with the total thickness of the optical lens 10 and the locking holder 31.

As shown in FIG. 3C, when the tail portion 3211 of the locking arm 322 is cut off in such a manner that a cut end of the locking arm 322 is indented on the locking holder 31 to define a receiving groove 3212 at the front end portion of the locking groove 311 of the locking holder 31. The locking member 32 further comprises a decorative cover 324 mounted in the receiving groove 3212 to cover the locking groove 311 of the locking holder 31.

In addition, since the locking arm 322 is slid to insert into the locking groove 311 from the rear side of the optical lens 10, the receiving groove 3212 is formed on the front side of the optical lens 10. Therefore, the decorative cover 324 mounted on the locking holder 31 can be designed as a logo plate or a spectacle decoration such as crystal plate to enhance the aesthetic appearance of the optical lens 10 and to substantially cover the receiving groove 3212.

Figure 4:
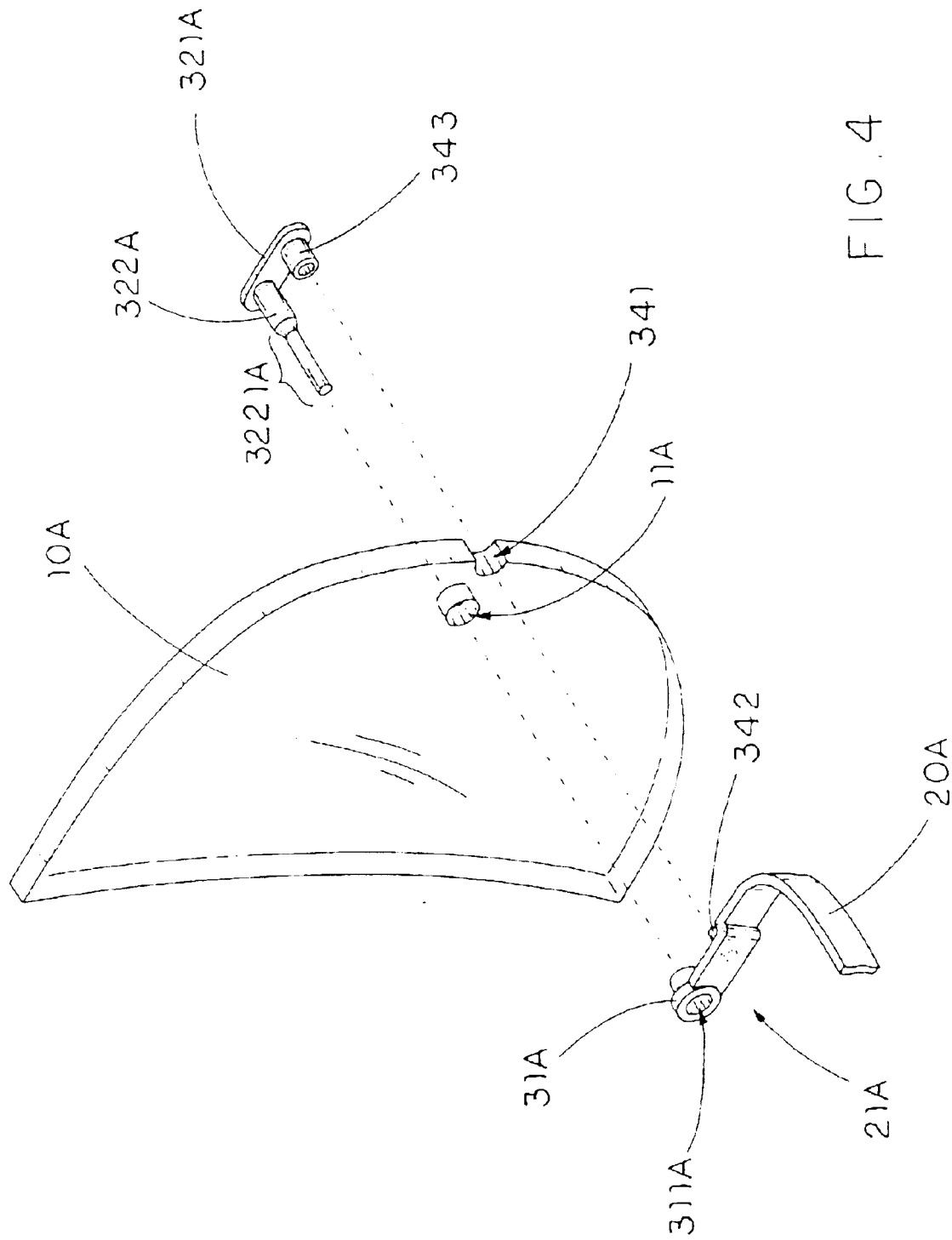
FIG. 4 illustrates an alternative mode of the optical lens securer device incorporating with the spectacles according to the above preferred embodiment of the present invention.

FIG. 4 illustrates an alternative mode of the optical lens securer device 30A of the preferred embodiment, wherein the locking arm 322A, having a circular cross section, is securely and coaxially inserted into the locking groove 311A which has a corresponding cross section so as to interlock the locking arm 322A with the locking holder 31A by friction for connecting the spectacle frame 20A with the optical lens 10A. Accordingly, a diameter of the locking arm 322A should be slightly larger than a diameter of the locking groove 311A such that when the locking arm 322A is inserted through the locking groove 311A, a portion of an outer circumferential surface of the locking arm 322A is frictionally biased against an inner circumferential surface of the locking groove 311A so as to interlock the locking arm 322A with the locking holder 31A by friction. It is worth to mention that the tail portion 3221A of the locking arm 322A is reduced in diameter for easily inserting into the locking groove 311A of the locking holder 31A.

Figure 5:
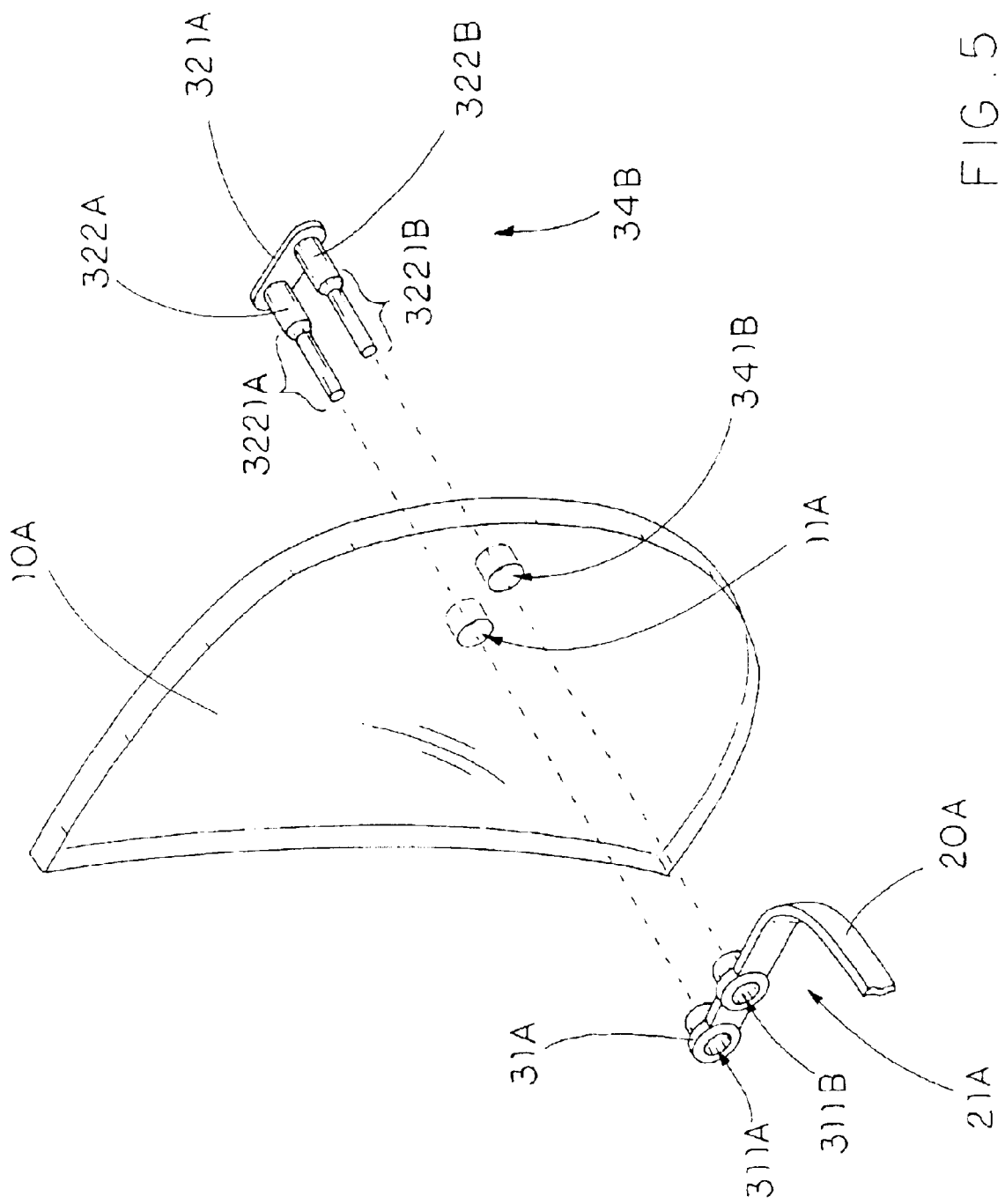
FIG. 5 illustrates an alternative mode of the retaining unit of the optical lens securer device incorporating with the spectacles according to the above preferred embodiment of the present invention.

FIG. 5 illustrates an alternative mode of the retaining unit 34B which has a retaining through hole 341B formed on an edge portion of the optical lens 10B adjacent to the through slot 11B thereof and comprises an auxiliary locking holder 31B, having an auxiliary locking groove 311B, formed adjacent to the locking holder 31A and an auxiliary locking arm 322B which is extended from the holding base 321A and arranged to insert into the auxiliary locking groove 311B through the retaining through hole 341B so as to further interlock the locking holder 31A with the locking member 32A for connecting the spectacle frame 20A with the optical lens 10A.

It is worth to mention that, as shown in FIGS. 4 and 5, the tail portions 3221A, 3221B of the locking arm 322A and the auxiliary locking arm 322B are respectively cut off to match with the thickness of the optical lens 10A. In other words, the optical lens 10A is securely sandwiched between the holding base 321A and the locking holder 31A via the locking arm 321A and the auxiliary locking arm 321B as a two-point connection to securely connect the spectacle frame 20A with the optical lens 10A so as to prevent any twisting movement of the spectacle frame 20A with respect to the optical lens 10A.

Figure 6:
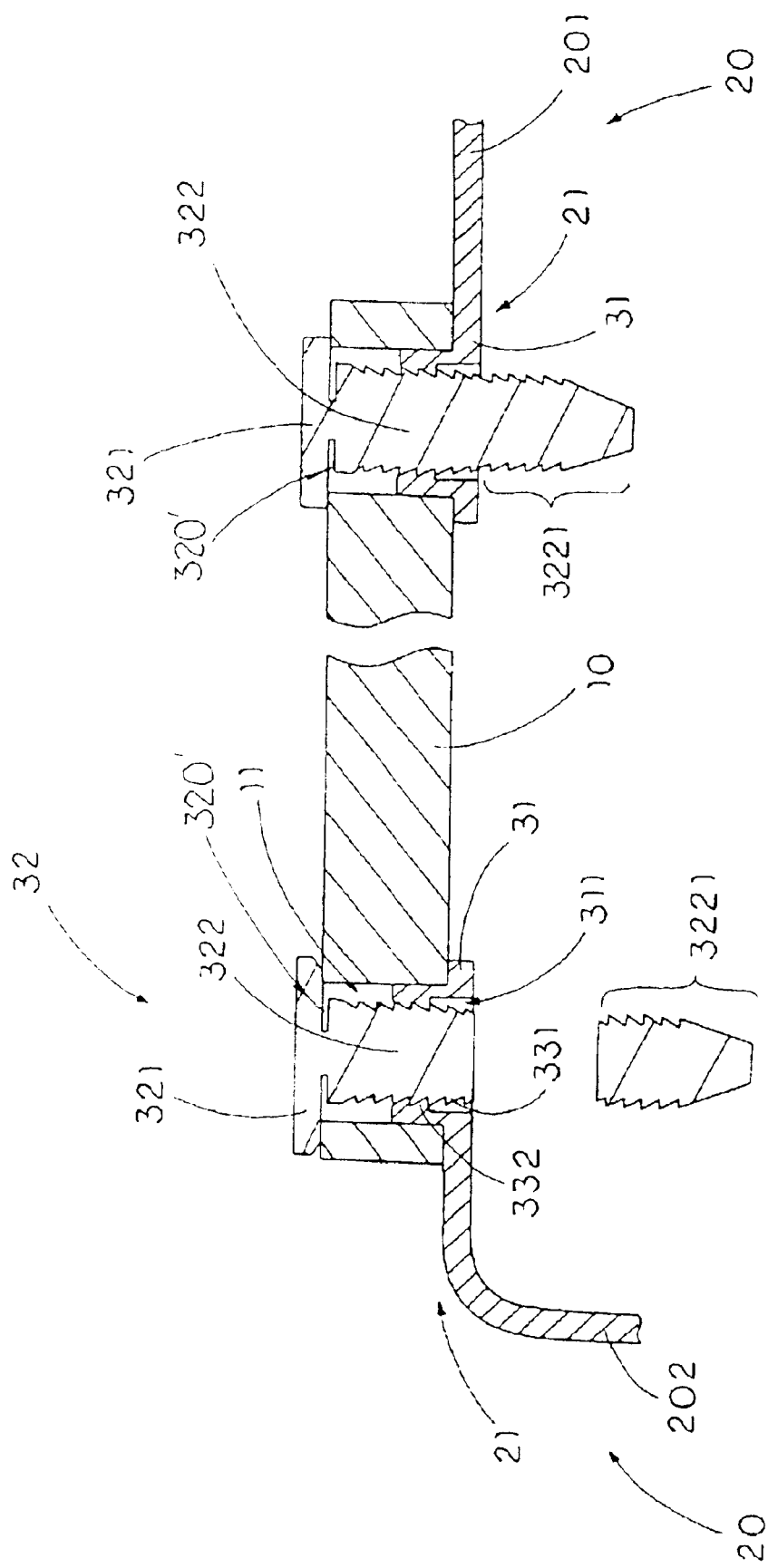
FIG. 6 illustrates a demo use optical lens securer device of the present invention.

As shown in FIG. 6, for demo lenses, since the demo lenses are temporarily mounted and need to be disassembled and replaced with the optical lenses 10, a circular gap 320' is formed at the root portion instead of the base shoulder, so that one can easily separate the holding base 321 with the locking arm 322.

Figure 7:
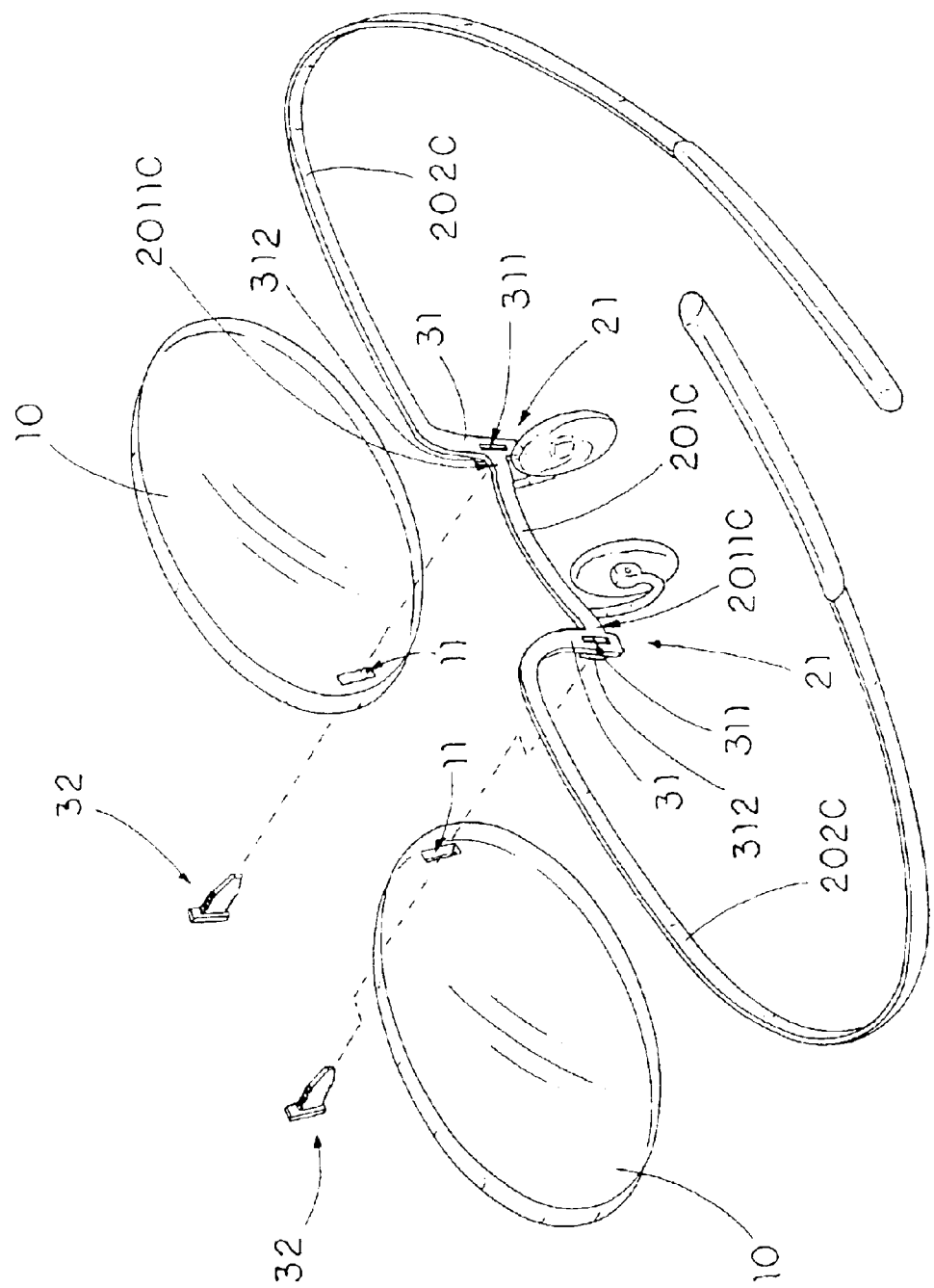
FIG. 7 illustrates an alternative mode of the spectacle frame incorporating with the optical lens securer device according to the above preferred embodiment of the present invention.

FIG. 7 illustrates an alternative mode of the spectacle frame 20C incorporating with the optical lens securer device 30, wherein the spectacle frame 20C comprises a bridge 201C having two bridge ends 2011C, and two elongated side extensions 202C integrally extended from the respective bridge end 2011C of the bridge 201C to the temples respectively, wherein each of the bridge ends 2011C of the bridge 201C is embodied as the coupling portion 21 to attach to an inner side of the optical lens 10.

As shown in FIG. 7, the locking holder 31 is provided at the respective bridge end 2011C of the bridge 201C wherein the locking groove 311 of the insertion portion 312 of the locking holder 31 is aligned with the through slot 11 of the optical lens 10 when the locking holder 31 is mounted on the optical lens 10. Therefore, without altering the structure of the optical lens securer device 30, the optical lenses 10 can be securely to fasten on the spectacle frame 20C to provide a specific configuration for the spectacles.

In the view of above, the optical lens securer device 30 provides a quick and simply lens fastening attachment for securely fastening the optical lens 10 on the spectacle frame 20. It is worth to mention that the positions of the locking holder 31 and the locking member 32 with respect to the optical lens 10 can be selectively interchanged to fit the need of the spectacles. In other words, the locking holder 31 can be mounted on either the rear side of the optical lens 10 as shown in FIGS. 3A and 3B or the front side of the optical lens 10 as shown in FIG. 3C in order to obtain different designs for the spectacles.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A spectacle device, comprising:

an optical lens having at least a through slot which has a predetermined length extended from a first side to a second side of said optical lens, wherein said through slot has a first end portion and a second end portion;

a spectacle frame having a coupling portion; and an optical lens securer device, comprising:

a locking holder having a locking groove penetrated therethrough, wherein said locking holder comprises:

a biasing portion, which is extended from said coupling portion of said spectacle frame, having a cross-sectional size larger than a cross-sectional size of said first end portion of said through slot of said optical lens, and an insertion portion protruded from said biasing portion, wherein said insertion portion has a thickness shorter than said length of said through slot of said optical lens and is sized and shaped to fittingly and securely insert into said first end portion of said through slot of said optical lens so as to mount said locking holder to said first side of said optical lens while said biasing portion is biased against said first side of said optical lens, wherein said locking groove is extended from said biasing portion to said insertion portion so as to communicate with said through slot of said optical lens;

a locking member comprising:

a holding base having a radial size larger than a radial size of said second end portion of said through slot of said optical lens, a locking arm, which is extended from said holding base, having a cross-sectional size smaller than a cross-sectional size of said through slot of said optical lens and a length longer than said length of said through slot of said optical lens, and a base shoulder, which is formed at a root portion of said locking arm, having a thickness shorter than said length of said through slot of said optical lens, wherein said base shoulder is enlarged to be sized and shaped to fittingly and securely insert into said second end portion of said through slot of said optical lens so as to mount said holding base to said second side of said optical lens while said holding base is biased against said second side of said optical lens, wherein said length of said through slot of said optical lens is equal to or longer than said thickness of said base shoulder plus said thickness of said insertion portion and said locking arm is extended to insert into said locking groove of said locking holder; and means for securing said locking arm with said locking holder to firmly hold said optical lens between said holding base of said locking member and said biasing portion of said locking holder in order to securely attach said spectacle frame to said optical lens.

2. The spectacle device, as recited in claim 1, wherein said means comprises a plurality of engaging teeth formed on an outer circumferential surface of said locking arm and at least a corresponding locking tooth provided on an inner wall of said locking groove of said locking holder, wherein when said locking arm is inserted through said locking groove of said locking holder, at least one of said locking teeth is securely interlocked with said engaging tooth so as to firmly connect said locking arm with said locking holder.

3. The spectacle device, as recited in claim 2, wherein said locking tooth is provided at an insertion end of said locking groove located at said insertion portion of said locking holder, wherein when said locking arm is inserted into said locking groove of said insertion portion of said locking holder, at least one of said locking teeth is securely interlocked with said engaging tooth so as to firmly connect said locking arm with said locking holder.

4. The spectacle device, as recited in claim 3, wherein each of said engaging teeth is outwardly protruded from said locking arm at a direction that opposes to an inserting direction of said locking arm with respect to said locking groove while said locking tooth is outwardly protruded from said inner wall of said locking groove at a direction with respect to said inserting direction of said locking arm in such a manner that when said locking arm is securely inserted into said locking groove, said engaging teeth are interlocked with said locking tooth so as to prevent said locking arm being slid in a reverse direction.

5. The spectacle device, as recited in claim 3, wherein said locking arm has a length longer than said length of said through slot of said optical lens, wherein a tail portion of said locking arm is extended out of said locking groove of said locking holder when said locking arm is inserted through said locking groove and interlocked with said insertion portion of said locking holder, whereby said tail portion of said locking arm that protrudes out of said locking holder is adapted to be cut away from said locking arm.

6. The spectacle device, as recited in claim 3, wherein said locking arm, having a non-circular cross section, is securely inserted into said locking groove which has a corresponding non-circular cross section, so as to resist a twisting movement of said spectacle frame with respect to said optical lens.

7. The spectacle device, as recited in claim 4, wherein said locking arm has a length longer than said length of said through slot of said optical lens, wherein a tail portion of said locking arm is extended out of said locking groove of said locking holder when said locking arm is inserted through said locking groove and interlocked with said insertion portion of said locking holder, whereby said tail portion of said locking arm that protrudes out of said locking holder is adapted to be cut away from said locking arm.

8. The spectacle device, as recited in claim 4, wherein said locking arm, having a non-circular cross section, is securely inserted into said locking groove which has a corresponding non-circular cross section, so as to resist a twisting movement of said spectacle frame with respect to said optical lens.

9. The spectacle device, as recited in claim 7, wherein said locking arm, having a non-circular cross section, is securely inserted into said locking groove which has a corresponding non-circular cross section, so as to resist a twisting movement of said spectacle frame with respect to said optical lens.

10. The spectacle device, as recited in claim 7, wherein a cut end of said locking arm is formed on said locking holder to define a receiving groove after said tail portion of said locking arm is cut off, wherein said locking member further comprises a decorative cover mounted on said locking holder within said receiving groove to cover said locking groove of said locking holder.

11. The spectacle device, as recited in claim 7, wherein a circular gap is formed at said base shoulder.

12. The spectacle device, as recited in claim 9, wherein said spectacle frame comprises a bridge having two bridge ends, two temples and two side extensions integrally extended from said respective bridge end of said bridge to said two temples, wherein each of said bridge ends of said bridge is embodied as said coupling portion such that said locking holder is integrally extended from said respective bridge end of said bridge to align said locking groove with said through slot of said optical lens.

13. The spectacle device, as recited in claim 2, wherein each of said engaging teeth is outwardly protruded from said locking arm at a direction that opposes to an inserting direction of said locking arm with respect to said locking groove while said locking tooth is outwardly protruded from said inner wall of said locking groove at a direction with respect to said inserting direction of said locking arm in such a manner that when said locking arm is securely inserted into said locking groove, said engaging teeth are interlocked with said locking tooth so as to prevent said locking arm being slid in a reverse direction.

14. The spectacle device, as recited in claim 13, wherein said locking arm has a length longer than said length of said through slot of said optical lens, wherein a tail portion of said locking arm is extended out of said locking groove of said locking holder when said locking arm is Inserted through said locking groove and interlocked with said locking holder, whereby said tail portion of said locking arm that protrudes out of said locking holder is adapted to be cut away from said locking arm.

15. The spectacle device, as recited in claim 13, wherein said locking arm, having a non-circular cross section, is securely inserted into said locking groove which has a corresponding non-circular cross section, so as to resist a twisting movement of said spectacle frame with respect to said optical lens.

16. The spectacle device, as recited in claim 14, wherein said locking arm, having a non-circular cross section, is securely inserted into said locking groove which has a corresponding non-circular cross section, so as to resist a twisting movement of said spectacle frame with respect to said optical lens.

17. The spectacle device, as recited in claim 14, wherein a cut end of said locking arm is formed on said locking holder to define a receiving groove after said tail portion of said locking arm is cut off, wherein said locking member further comprises a decorative cover mounted on said locking holder within said receiving groove to cover said locking groove of said locking holder.

18. The spectacle device, as recited in claim 14, wherein a circular gap is formed at said base shoulder.

19. The spectacle device, as recited in claim 16, wherein said spectacle frame comprises a bridge having two bridge ends, two temples and two side extensions integrally extended from said respective bridge end of said bridge to said two temples, wherein each of said bridge ends of said bridge is embodied as said coupling portion such that said locking holder is integrally extended from said respective bridge end of said bridge to align said locking groove with said through slot of said optical lens.

20. The spectacle device, as recited in claim 2, wherein said locking arm has a length longer than said length of said through slot of said optical lens, wherein a tail portion of said locking arm is extended out of said locking groove of said locking holder when said locking arm is inserted through said locking groove and interlocked with said locking holder, whereby said tail portion of said locking arm that protrudes out of said locking holder is adapted to be cut away from said locking arm.

21. The spectacle device, as recited in claim 2, wherein said locking arm, having a non-circular cross section, is securely inserted into said locking groove which has a corresponding non-circular cross section, so as to resist a twisting movement of said spectacle frame with respect to said optical lens.

22. The spectacle device, as recited in claim 21, wherein said spectacle frame comprises a bridge having two bridge ends, two temples and two side extensions integrally extended from said respective bridge end of said bridge to said two temples, wherein each of said bridge ends of said bridge is embodied as said coupling portion such that said locking holder is integrally extended from said respective bridge end of said bridge to align said locking groove with said through slot of said optical lens.

23. The spectacle device, as recited in claim 2, wherein said optical lens securer device further comprises a retaining arrangement which has a retaining through slot formed on an outer edge of said optical lens and comprises a retaining arm extended from said locking holder to bias against into said retaining through slot and a mounting socket extended from said holding base to enable said retaining arm to securely insert therein.

24. The spectacle device, as recited in claim 2, wherein a circular gap is formed at said base shoulder.

25. The spectacle device, as recited in claim 2, wherein said spectacle frame comprises a bridge having two bridge ends, two temples and two side extensions integrally extended from said respective bridge end of said bridge to said two temples, wherein each of said bridge ends of said bridge is embodied as said coupling portion such that said locking holder is integrally extended from said respective bridge end of said bridge to align said locking groove with said through slot of said optical lens.

26. The spectacle device, as recited in claim 1, wherein each of said engaging teeth are outwardly protruded from said locking arm at a direction that opposes to an inserting direction of said locking arm with respect to said locking groove while said locking tooth is outwardly protruded from an inner wall of said locking groove at a direction with respect to said inserting direction of said locking arm in such a manner that when said locking arm is securely inserted into said locking groove, said engaging teeth are interlocked with said locking tooth so as to prevent said locking arm being slid in a reverse direction.

27. The spectacle device, as recited in claim 26, wherein said locking arm, having a non-circular cross section, is securely inserted into said locking groove which has a corresponding non-circular cross section, so as to resist a twisting movement of said spectacle frame with respect to said optical lens.

28. The spectacle device, as recited in claim 1, wherein said locking arm has a length longer than said length of said through slot of said optical lens, wherein a tail portion of said locking arm is extended out of said locking groove of said locking holder when said locking arm is inserted through said locking groove and interlocked with said locking holder, whereby said tail portion of said locking arm that protrudes out of said locking holder is adapted to be cut away from said locking arm.

29. The spectacle device, as recited in claim 28, wherein said locking arm, having a non-circular cross section, is securely inserted into said locking groove which has a corresponding non-circular cross section, so as to resist a twisting movement of said spectacle frame with respect to said optical lens.

30. The spectacle device, as recited in claim 28, wherein a cut end of said locking arm is formed on said locking holder to define a receiving groove after said tail portion of said locking arm is cut off, wherein said locking member further comprises a decorative cover mounted on said locking holder within said receiving groove to cover said locking groove of said locking holder.

31. The spectacle device, as recited in claim 28, wherein said spectacle frame comprises a bridge having two bridge ends, two temples and two side extensions integrally extended from said respective bridge end of said bridge to said two temples, wherein each of said bridge ends of said bridge is embodied as said coupling portion such that said looking holder is integrally extended from said respective bridge end of said bridge to align said locking groove with said through slot of said optical lens.

32. The spectacle device, as recited in claim 29, wherein said spectacle frame comprises a bridge having two bridge ends, two temples and two side extensions integrally extended from said respective bridge end of said bridge to said two temples, wherein each of said bridge ends of said bridge is embodied as said coupling portion such that said locking holder is integrally extended from said respective bridge end of said bridge to align said locking groove with said through slot of said optical lens.

33. The spectacle device, as recited in claim 1, wherein said locking arm, having a non-circular cross section, is securely inserted into said locking groove which has a corresponding non-circular cross section, so as to resist a twisting movement of said spectacle frame with respect to said optical lens.

34. The spectacle device, as recited in claim 1, wherein said optical lens securer device further comprises a retaining arrangement which has a retaining groove formed on an outer edge of said optical lens and comprises a retaining arm extended from said locking holder to bias against into said retaining groove and a mounting socket extended from said holding base to enable said retaining arm to securely insert therein.

35. The spectacle device, as recited in claim 1, wherein a circular gap is formed at said base shoulder.

36. The spectacle device, as recited in claim 1, wherein said spectacle frame comprises a bridge having two bridge ends, two temples and two side extensions integrally extended from said respective bridge end of said bridge to said two temples, wherein each of said bridge ends of said bridge is embodied as said coupling portion such that said locking holder is integrally extended from said respective bridge end of said bridge to align said locking groove with said through slot of said optical lens.

* * * * *